United States Patent
Zhang et al.

(10) Patent No.: US 11,518,614 B2
(45) Date of Patent: Dec. 6, 2022

(54) STEREOSCOPIC WAREHOUSING EQUIPMENT

(71) Applicant: Dongguan University of Technology, Guangdong (CN)

(72) Inventors: Zhi-cong Zhang, Guangdong (CN); Wei-feng He, Guangdong (CN); Xiao-hui Yan, Guangdong (CN); Liang-wei Zhang, Guangdong (CN); Shuai Li, Guangdong (CN)

(73) Assignee: Dongguan University of Technology

( * ) Notice: Subject to any disclaimer, the term of this patent is extended or adjusted under 35 U.S.C. 154(b) by 0 days.

(21) Appl. No.: 17/403,159

(22) Filed: Aug. 16, 2021

(65) Prior Publication Data
US 2022/0348408 A1    Nov. 3, 2022

(51) Int. Cl.
*B65G 1/137* (2006.01)
*B65G 1/04* (2006.01)

(52) U.S. Cl.
CPC .......... *B65G 1/137* (2013.01); *B65G 1/0492* (2013.01); *B65G 2814/0313* (2013.01)

(58) Field of Classification Search
CPC .................. B65G 2814/0313; B65G 1/137
See application file for complete search history.

(56) References Cited

U.S. PATENT DOCUMENTS

2019/0293344 A1*  9/2019  Sun ...................... A01N 1/0257
2020/0017301 A1*  1/2020  Stefani .................... B65G 1/12

* cited by examiner

*Primary Examiner* — Saul Rodriguez
*Assistant Examiner* — Willie Berry, Jr.

(57) ABSTRACT

A stereoscopic warehousing equipment comprising a conveying line assembly, a left storage assembly located at left end of the conveying line assembly, a right storage assembly located on tright end of the conveying line assembly, and a transferring carrying assembly arranged above the conveying line assembly and located between the left storage assembly and the right storage assembly, wherein the conveying line assembly comprising a conveying line mounting frame, an upper speed-chain conveying line and a lower speed-chain conveying line, wherein the conveying line mounting frame is provided with a lifting conveying platform located at front end of the upper and lower speed-chain conveying lines, wherein the lifting conveying platform comprising an electric lifting platform and a middle speed-chain conveying line, wherein the transferring carrying assembly comprising a transferring carrying portal frame, a horizontal driving linear module, a left carrying mechanism and a right carrying mechanism.

10 Claims, 11 Drawing Sheets

STEREOSCOPIC WAREHOUSING EQUIPMENT

TECHNICAL FIELD

This invention generally relates to the technical field of warehousing equipment, and more particularly, to a novel stereoscopic warehousing equipment.

BACKGROUND

When storing a large variety of commodities in a warehouse, a warehousing equipment is normally adopted to pick and place the commodities, thereby allowing them to be orderly placed in desired locations to be conveniently transferred.

In prior art, these commodities are primarily manually processed, which is labor-intensive and low-efficient.

SUMMARY

The purpose of the present invention is to provide a novel stereoscopic warehousing equipment. Through adopting the present invention, the picking and placing of commodities are achieved automatically and efficiently. The present invention has a novel structural design, achieves high automation degree and achieves high operating efficiency.

To achieve the above purpose, the present invention adopts the following technical solution: a stereoscopic warehousing equipment comprising a conveying line assembly, a left storage assembly located at the left end of the conveying line assembly, a right storage assembly located on the right end of the conveying line assembly, and a transferring carrying assembly arranged above the conveying line assembly and located between the left storage assembly and the right storage assembly.

The conveying line assembly comprises a conveying line mounting frame, wherein the conveying line mounting frame is provided with a lower speed-chain conveying line and an upper speed-chain conveying line which respectively horizontally extend along the front direction and the rear direction. The lower speed-chain conveying line is arranged below the upper speed-chain conveying line. The lower speed-chain conveying line and the upper speed-chain conveying line are arranged at intervals. In operation, the lower speed-chain conveying line conveys the commodities from back to front, and the upper speed-chain conveying line conveys the commodities from front to back.

The conveying line mounting frame is provided a lifting conveying platform, which is located at the front end of the lower speed-chain conveying line and the upper speed-chain conveying line. The lifting conveying platform comprises an electric lifting platform arranged on the conveying line mounting frame, and the lifting end of the electric lifting platform is provided with a middle speed-chain conveying line extending horizontally along the front direction and the rear direction. The lower speed-chain conveying line is provided with a lower material blocking mechanism, which is located at the rear end of the lifting conveying platform. The upper speed-chain conveying line is provided with a first upper material blocking mechanism and a second upper material blocking mechanism which are sequentially arranged at intervals along the conveying direction of the upper speed-chain conveying line and are located at the rear end of the lifting conveying platform. The upper speed-chain conveying line is provided with an auxiliary lifting mechanism, which is located between the first upper material blocking mechanism and the second upper material blocking mechanism.

The transferring carrying assembly comprises a transferring carrying portal frame, wherein the transferring carrying portal frame further comprises a portal frame left supporting seat located at the left end of the conveying line assembly and a portal frame right supporting seat located at the right end of the conveying line assembly. A portal frame transverse seat located at the upper end of the conveying line assembly is arranged between the upper end of the portal frame left supporting seat and the upper end of the portal frame right supporting seat. The left end and the right end of the portal frame transverse seat are respectively in threaded connection with the upper end of the portal frame left supporting seat and the upper end of the portal frame right supporting seat on a corresponding side. The portal frame transverse seat is provided with a left carrying mechanism and a right carrying mechanism synchronously moving in the same direction. The left side carrying mechanism is located on the left end of the right carrying mechanism, and the left carrying mechanism and the right carrying mechanism are arranged at intervals. The portal frame transverse seat is provided with a horizontal driving linear module capable of horizontally moving left and right corresponding to the left carrying mechanism and the right carrying mechanism. The driving ends of the horizontal driving linear module are respectively in driving connection with the left carrying mechanism and the right carrying mechanism.

The left carrying mechanism and the right carrying mechanism respectively comprise a carrying horizontal-moving frame. Each carrying horizontal-moving frame is in threaded connection with a carrying lifting driving air cylinder capable of moving up and down. The lower end of each carrying horizontal-moving frame is respectively provided with a carrying lifting moving frame. An extending end of a piston rod of each carrying lifting driving air cylinder is respectively connected with a corresponding carrying lifting moving frame. Each carrying lifting moving frame is respectively provided with a pneumatic clamping device.

The left storage assembly and the right storage assembly respectively comprise a storage rack and a storage pick-and-place mechanism located beside the storage rack. The storage pick-and-place mechanism comprises a pick-and-place mounting base, and the upper end of the pick-and-place mounting base is provided with a pick-and-place horizontal moving frame capable of relatively horizontally moving left and right. A pick-and-place horizontal driving mechanism is arranged between the pick-and-place mounting base and the pick-and-place horizontal moving frame, and the pick-and-place horizontal driving mechanism is in driving connection with the pick-and-place horizontal moving frame. The pick-and-place horizontal moving frame is provided with a pick-and-place lifting moving frame capable of relatively moving up and down, and the pick-and-place horizontal moving frame is provided with a pick-and-place lifting driving mechanism corresponding to the pick-and-place lifting moving frame. The pick-and-place lifting driving mechanism is in driving connection with the pick-and-place lifting moving frame, and the pick-and-place lifting moving frame is provided with a pick-and-place pushing mechanism.

The pick-and-place pushing mechanism comprises a pick-and-place pushing fixed seat, a pick-and-place pushing moving seat and a pick-and-place support plate.

The pick-and-place pushing fixed seat is fixed and in threaded connection with the pick-and-place lifting moving frame, and the pick-and-place pushing fixed seat is provided with a fixed seat bottom plate. The pick-and-place pushing moving seat is provided with a moving seat bottom plate located at the upper end of the fixed seat bottom plate, and the pick-and-place support plate is located at the upper end of the moving seat bottom plate. The pick-and-place pushing fixed seat in threaded connection with a pick-and-place pushing driving air cylinder capable of horizontally moving front and back, and an extending end of a piston rod of the pick-and-place pushing driving air cylinder is connected with the pick-and-place pushing moving seat.

The moving seat bottom plate is provided with a first chain wheel and a second chain wheel. The moving seat bottom plate is provided with a bottom plate through hole corresponding to the first chain wheel and the second chain wheel, wherein the first chain wheel and the second chain wheel are respectively mounted in the bottom plate through hole of the moving seat bottom plate through a rotating shaft.

The fixed seat bottom plate is provided with a first lower connecting piece corresponding to the first chain wheel, and the pick-and-place support plate is provided with a first upper connecting piece corresponding to the first chain wheel. The first lower connecting piece and the first upper connecting piece are respectively located at the rear end of the first chain wheel, a first chain is connected between the first lower connecting piece and the first upper connecting piece, and the first chain winds around the first chain wheel.

The fixed seat bottom plate is provided with a second lower connecting piece corresponding to the second chain wheel, and the pick-and-place support plate is provided with a second upper connecting piece corresponding to the second chain wheel. The second lower connecting piece and the second upper connecting piece are respectively located at the front end of the second chain wheel, a second chain is connected between the second lower connecting piece and the second upper connecting piece, and the second chain winds around the second chain wheel.

The pick-and-place pushing fixed seat is in threaded connection with a fixed seat sliding block, and the pick-and-place support plate in threaded connection with a support plate sliding block.

The pick-and-place pushing moving seat is provided with a guiding rail mounting plate. The guiding rail mounting plate is in threaded connection with a first guiding rail interacting with the fixed seat sliding block and a second guiding rail interacting with the support plate sliding block. The first guiding rail and the second guiding rail respectively extend horizontally along the front direction and the rear direction.

The lower material blocking mechanism, the first upper material blocking mechanism and the second upper material blocking mechanism respectively comprise a material blocking driving air cylinder which is in threaded connection with the conveying line mounting frame and is capable of moving up and down. The extending end of the piston rod of each material blocking driving air cylinder is respectively provided with a moving material-blocking block.

The auxiliary lifting mechanism comprises a lifting driving air cylinder which is in threaded connection with the conveying line mounting frame and is capable of moving up and down, and the extending end of the piston rod of the lifting driving air cylinder is provided with a moving lifting platform. A lifting guiding post extending downward vertically is in threaded connection with the moving lifting platform, a lifting guiding sleeve corresponding to the lifting guiding post is in threaded connection with the conveying line mounting frame, and the lifting guiding post is inserted in the central hole of the lifting guiding sleeve.

The horizontal driving linear module comprises a driving synchronous belt wheel and a driven synchronous belt wheel which are respectively arranged on the portal frame transverse seat. The driving synchronous belt wheel and the driven synchronous belt wheel are arranged horizontally at intervals and are aligned with each other. A transmission synchronous belt is wound between the driving synchronous belt wheel and the driven synchronous belt wheel. The carrying horizontal-moving frame of the left carrying mechanism and the carrying horizontal-moving frame of the right carrying mechanism are respectively fixedly connected with the transmission synchronous belt.

The portal frame transverse seat is provided with a transferring carrying driving motor corresponding to the driving synchronous belt wheel, and the output shaft of the transferring carrying driving motor is in driving connection with the driving synchronous belt wheel.

The portal frame transverse seat is in threaded connection with a transferring carrying guiding rail extending horizontally along the left direction and the right direction, each carrying horizontal-moving frame is in threaded connection with a transferring carrying sliding block, and each transferring carrying sliding block interacts with a rotating shaft carrying guiding rail.

Each carrying lifting moving frame is respectively provided with a transferring carrying guide post arranged vertically, and each carrying horizontal-moving frame is respectively provided with a transferring carrying guide sleeve, wherein each transferring carrying guide post is respectively inserted in a central hole of a corresponding transferring carrying guide sleeve.

The pick-and-place driving mechanism comprises a horizontal driving gear rack which is in threaded connection with the pick-and-place mounting base and extends horizontally along the left direction and the right direction. A pick-and-place horizontal driving motor is in threaded connection with the lower end of the pick-and-place horizontal moving frame, the output shaft of the pick-and-place horizontal driving motor is provided with a pick-and-place horizontal driving gear, and the horizontal driving gear rack is meshed with the pick-and-place horizontal driving gear.

The pick-and-place mounting base is in threaded connection with a pick-and-place horizontal guiding rail located beside the pick-and-place horizontal driving gear rack and horizontally extending along the right direction and the left direction. The lower end of the pick-and-place horizontal moving frame is in threaded connection with a pick-and-place horizontal sliding block, and pick-and-place horizontal guiding rail interacts with the pick-and-place horizontal sliding block.

The pick-and-place lifting driving mechanism comprises a pick-and-place lifting driving motor in threaded connection with the upper end of the pick-and-place horizontal moving frame and a vertically-arranged pick-and-place lifting driving screw rod mounted on the pick-and-place horizontal moving frame through a bearing seat.

A pick-and-place lifting moving frame is in threaded connection with a pick-and-place lifting lead screw nut corresponding to the pick-and-place lifting driving screw rod, and the pick-and-place lifting lead screw nut interacts with the pick-and-place lifting driving screw rod.

The pick-and-place horizontal moving frame is in threaded connection with a vertically-arranged pick-and-place lifting guiding rail, the pick-and-place lifting moving frame is in threaded connection with a pick-and-place lifting sliding block corresponding to the pick-and-place lifting guiding rail, and the pick-and-place lifting guiding rail interacts with the pick-and-place lifting sliding block.

Compared with the prior art, the present invention has the following advantages:

The stereoscopic warehousing equipment of the present invention comprises a conveying line assembly, a left storage assembly located at the left end of the conveying line assembly, a right storage assembly located on the right end of the conveying line assembly, and a transferring carrying assembly arranged above the conveying line assembly and located between the left storage assembly and the right storage assembly. The conveying line assembly comprises a conveying line mounting frame, wherein the conveying line mounting frame is provided with a lower speed-chain conveying line and an upper speed-chain conveying line which respectively horizontally extend along the front direction and the rear direction. The lower speed-chain conveying line is arranged below the upper speed-chain conveying line. The lower speed-chain conveying line and the upper speed-chain conveying line are arranged at intervals. In operation, the lower speed-chain conveying line conveys the commodities from back to front, and the upper speed-chain conveying line conveys the commodities from front to back. A conveying line mounting frame is provided a lifting conveying platform, which is located at the front end of the lower speed-chain conveying line and the upper speed-chain conveying line. The lifting conveying platform comprises an electric lifting platform arranged on the conveying line mounting frame, and the lifting end of the electric lifting platform is provided with a middle speed-chain conveying line extending horizontally along the front direction and the rear direction. The lower speed-chain conveying line is provided with a lower material blocking mechanism, which is located at the rear end of the lifting conveying platform. The upper speed-chain conveying line is provided with a first upper material blocking mechanism and a second upper material blocking mechanism which are sequentially arranged at intervals along the conveying direction of the upper speed-chain conveying line and are located at the rear end of the lifting conveying platform. The upper speed-chain conveying line is provided with an auxiliary lifting mechanism, which is located between the first upper material blocking mechanism and the second upper material blocking mechanism. The transferring carrying assembly comprises a transferring carrying portal frame, wherein the transferring carrying portal frame further comprises a portal frame left supporting seat located at the left end of the conveying line assembly and a portal frame right supporting seat located at the right end of the conveying line assembly. A portal frame transverse seat located at the upper end of the conveying line assembly is arranged between the upper end of the portal frame left supporting seat and the upper end of the portal frame right supporting seat. The left end and the right end of the portal frame transverse seat are respectively in threaded connection with the upper end of the portal frame left supporting seat and the upper end of the portal frame right supporting seat on a corresponding side. The portal frame transverse seat is provided with a left carrying mechanism and a right carrying mechanism synchronously moving in the same direction. The left side carrying mechanism is located on the left end of the right carrying mechanism, and the left carrying mechanism and the right carrying mechanism are arranged at intervals. The portal frame transverse seat is provided with a horizontal driving linear module capable of horizontally moving left and right corresponding to the left carrying mechanism and the right carrying mecha- nism. The driving ends of the horizontal driving linear module are respectively in driving connection with the left carrying mechanism and the right carrying mechanism. The left carrying mechanism and the right carrying mechanism respectively comprise a carrying horizontal-moving frame. Each carrying horizontal-moving frame is in threaded connection with a carrying lifting driving air cylinder capable of moving up and down. The lower end of each carrying horizontal-moving frame is respectively provided with a carrying lifting moving frame. An extending end of a piston rod of each carrying lifting driving air cylinder is respectively connected with a corresponding carrying lifting moving frame. Each carrying lifting moving frame is respectively provided with a pneumatic clamping device. The left storage assembly and the right storage assembly respectively comprise a storage rack and a storage pick-and-place mechanism located beside the storage rack. The storage pick-and-place mechanism comprises a pick-and-place mounting base, and the upper end of the pick-and-place mounting base is provided with a pick-and-place horizontal moving frame capable of relatively horizontally moving left and right. A pick-and-place horizontal driving mechanism is arranged between the pick-and-place mounting base and the pick-and-place horizontal moving frame, and the pick-and-place horizontal driving mechanism is in driving connection with the pick-and-place horizontal moving frame. The pick-and-place horizontal moving frame is provided with a pick-and-place lifting moving frame capable of relatively moving up and down, and the pick-and-place horizontal moving frame is provided with a pick-and-place lifting driving mechanism corresponding to the pick-and-place lifting moving frame. The pick-and-place lifting driving mechanism is in driving connection with the pick-and-place lifting moving frame, and the pick-and-place lifting moving frame is provided with a pick-and-place pushing mechanism. Through adopting the aforesaid structural design, the picking and placing of the commodities are achieved automatically and efficiently. The present invention has the benefits of structural design, high automation degree and high operating efficiency.

BRIEF DESCRIPTION OF THE DRAWINGS

Drawings are combined hereinafter to further describe the present invention, but the embodiments in the drawings do not limit the scope of the present invention.

In FIGS. 1-11:

1—Conveying Line Assembly, 11—Conveying Line Mounting Frame, 12—Lower Speed-chain Conveying Line, 13—Upper Speed-chain Conveying Line, 14—Lifting Conveying Platform, 151—Lower Material Blocking Mechanism, 152—The First Upper Material Blocking Mechanism, 153—The Second Upper Material Blocking Mechanism, 1541—Material Blocking Driving Air Cylinder, 1542—Moving Material—blocking Block, 16—Auxiliary Lifting Mechanism, 161—Lifting Driving Air Cylinder, 162—Moving Lifting Platform, 21—Left Storage Assembly, 22—Right Storage Assembly, 3—Transferring Carrying Assembly, 31—Transferring Carrying Portal Frame, 311—Transferring Carrying Left Supporting Seat, 312—Portal Frame Right Supporting Seat, 313—Portal Frame Transverse Seat, 321—Left Carrying Mechanism, 322—Right Carrying Mechanism, 33—Horizontal Driving Linear Module, 331—Driven Synchronous Belt Wheel, 332—Transmission Synchronous Belt, 333—Transferring Carrying Driving Motor, 334—Transferring Carrying Guiding Rail, 335—Transferring Carrying Sliding Block, 341—Carrying Horizontal-moving Frame, 342—Carrying Lifting Driving Air Cylinder, 343—Carrying Lifting Moving Frame, 344—Pneumatic Grabbing Device, 351—Transferring Carrying Guiding Post, 352—Transferring Carrying Guiding Sleeve, 4—Storage Rack, 5—Storage Pick-and-place Mechanism, 51—Pick-and-place Mounting Base, 52—Pick-and-place Horizontal Moving Frame, 53—Pick-and-place Horizontal Driving Mechanism, 531—Pick-and-place Horizontal Driving Gear Rack, 532—Pick-and-place Horizontal Driving Motor, 533—Pick-and-place Horizontal Driving Gear, 534—Pick-and-place Horizontal Guiding Rail, 535—Pick-and-place Horizontal Sliding Block, 54—Pick-and-place Lifting Moving Frame, 55—Pick-and-place Lifting Driving Mechanism, 551—Pick-and-place Lifting Driving Motor, 552—Pick-and-place Lifting Driving Screw Rod, 553—Pick-and-place Lifting Lead Screw Nut, 554—Pick-and-place Lifting Guiding Rail, 555—Pick-and-place Lifting Sliding Block, 56—Pick-and-place Pushing Mechanism, 561—Pick-and-place Pushing Fixed Seat, 5611—Fixed Seat Bottom Plate, 562—Pick-and-place Pushing Moving Seat, 5621—Moving Seat Bottom Plate, 56211—Bottom Plate Through Hole, 5622—Guiding Rail Mounting Plate, 563—Pick-and-place Support Plate, 564—Pick-and-place Pushing Air Cylinder, 5651—The First Chain Wheel, 5652—The First Lower Connecting Piece, 5653—The First Upper Connecting Piece, 5661—The Second Chain Wheel, 5662—The Second Lower Connecting Piece, 5663—The Second Upper Connecting Piece, 5671—Fixed Seat Sliding Block, 5672—Support Plate Sliding Block, 5673—The First Guiding Rail, 5674—The Second Guiding Rail.

DETAILED DESCRIPTION

Detailed embodiments are combined hereinafter to further elaborate the technical solution of the present invention.

Figure 1:
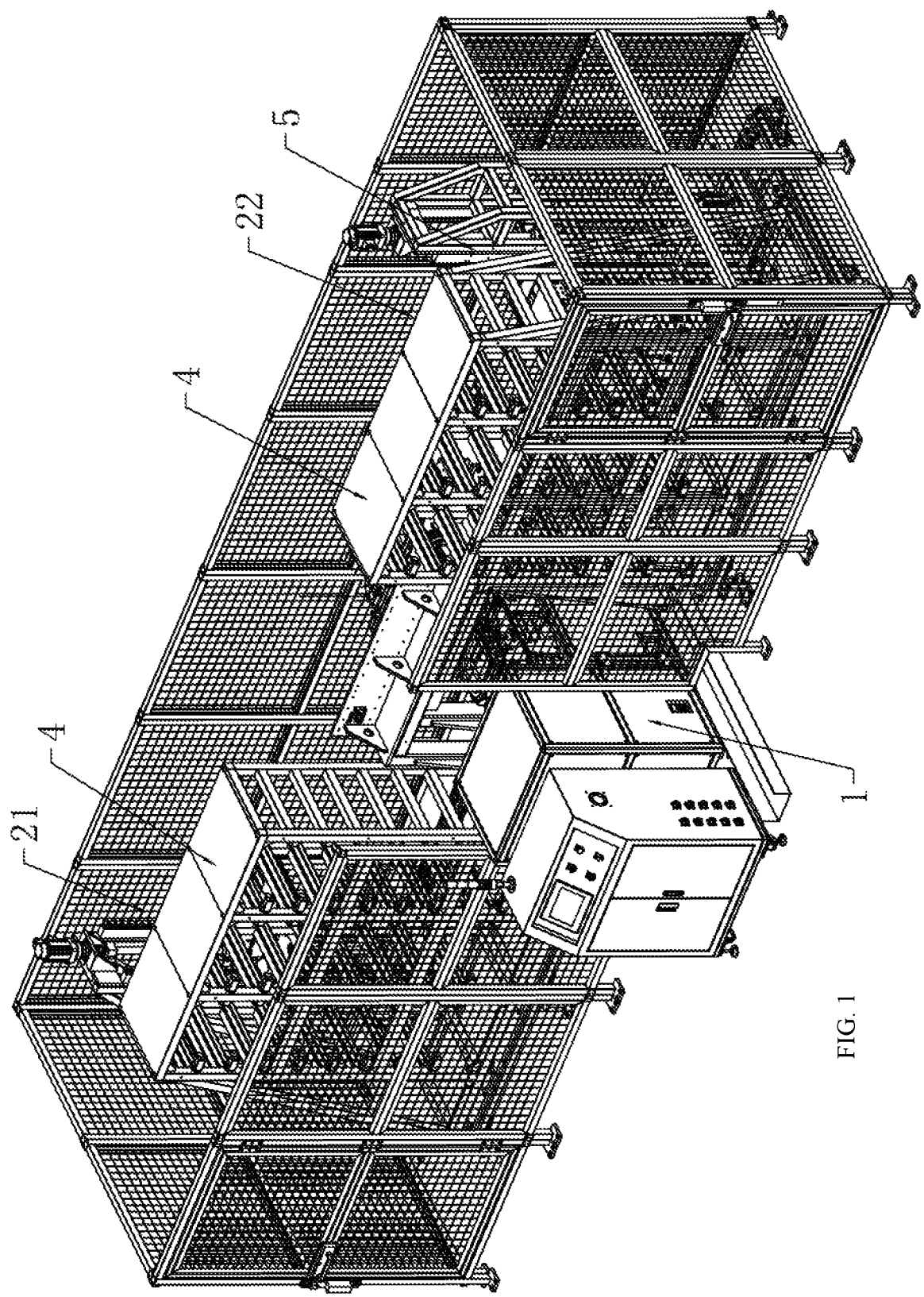
FIG. 1 is a conceptual diagram illustrating an exemplary structure of the present invention.
Figure 2:
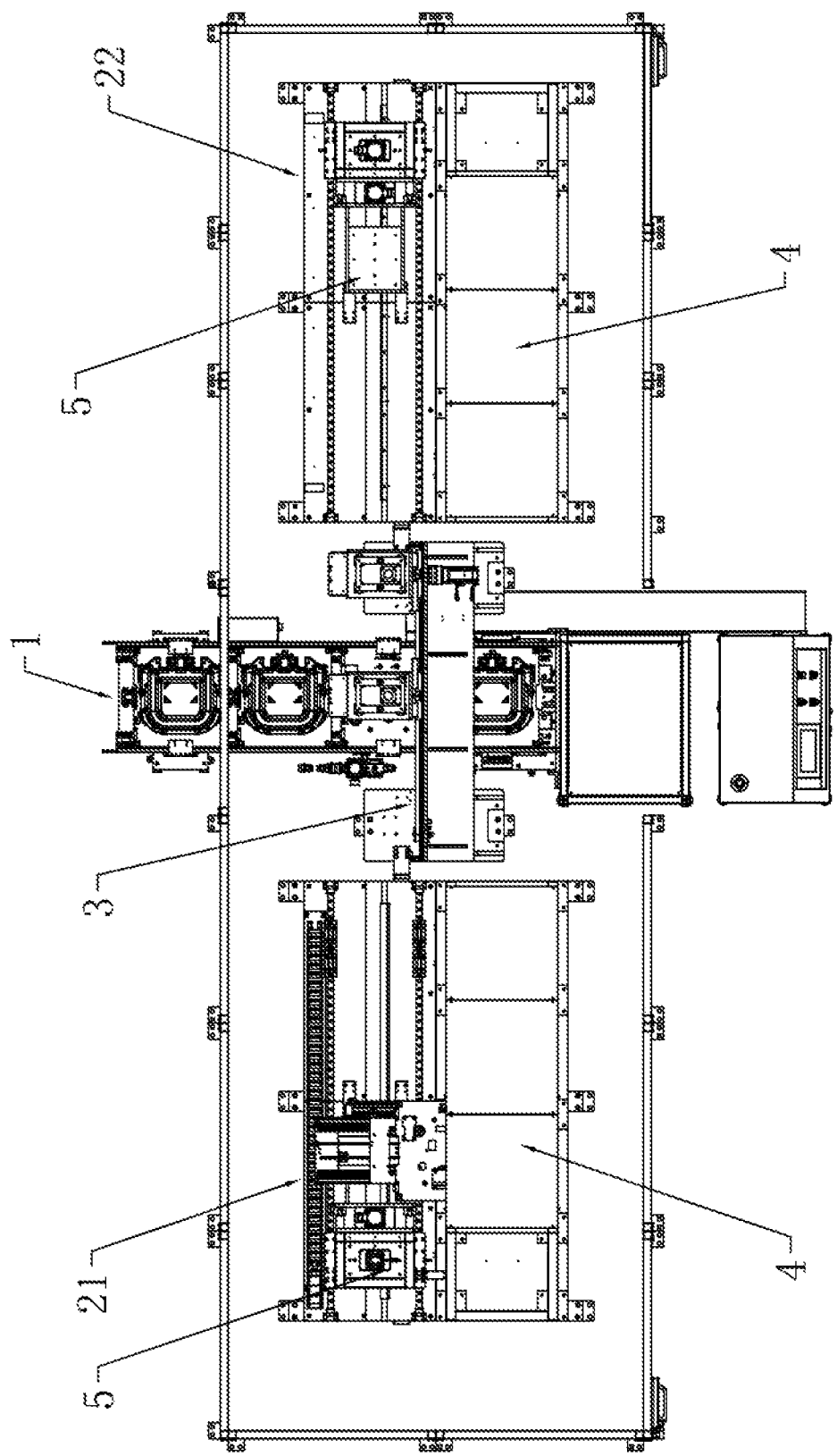
FIG. 2 is a conceptual diagram illustrating an exemplary structure of the present invention from another viewing angle.

As shown in FIGS. 1-2, a stereoscopic warehousing equipment comprises a conveying line assembly 1, a left storage assembly 21 located at the left end of the conveying line assembly 1, a right storage assembly 22 located on the right end of the conveying line assembly 1, and a transferring carrying assembly 3 arranged above the conveying line assembly 1 and located between the left storage assembly 21 and the right storage assembly 22.

Figure 3:
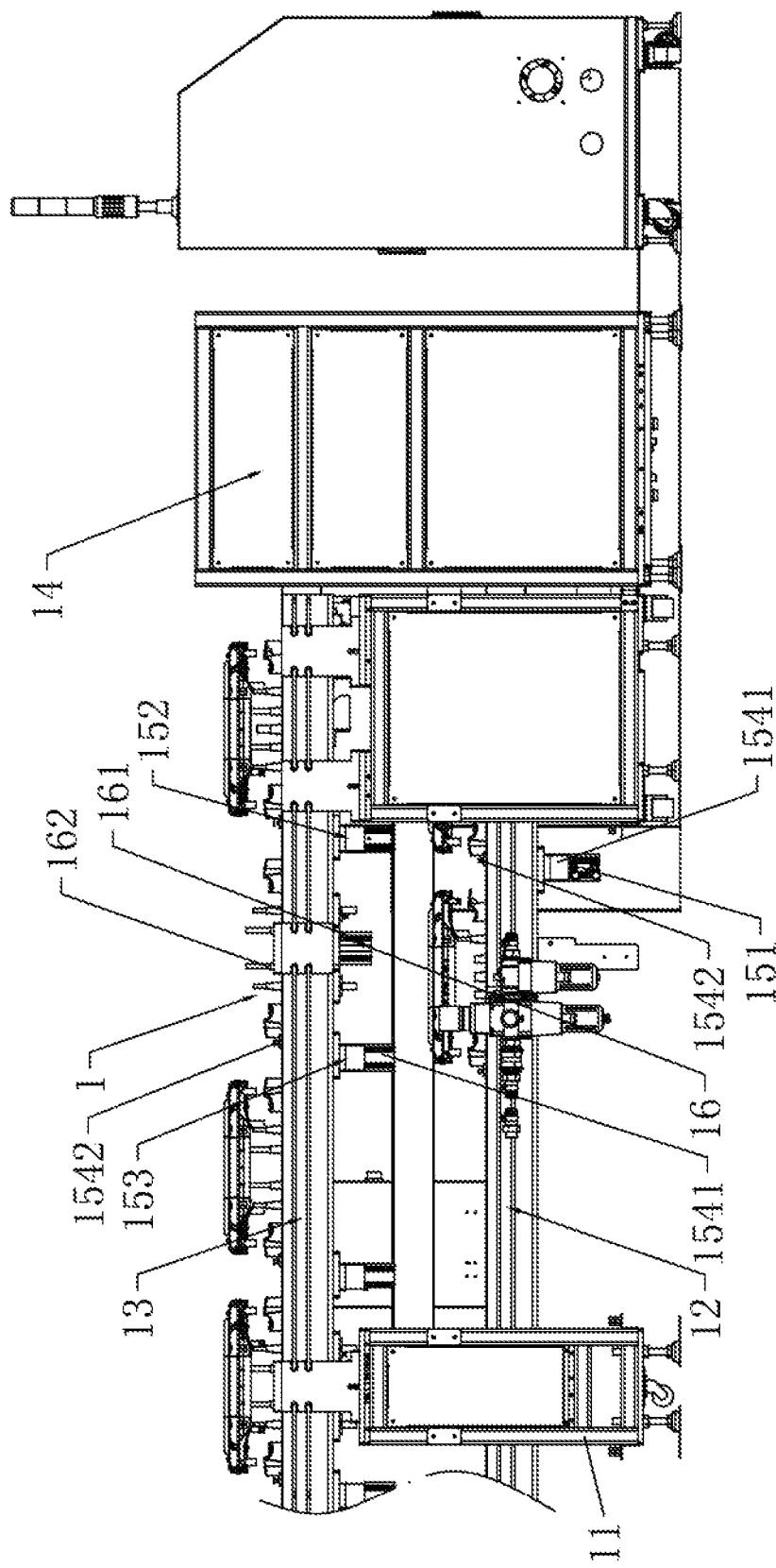
FIG. 3 is a conceptual diagram illustrating an exemplary structure of the conveying line assembly of the present invention.

As shown in FIG. 3, the conveying line assembly 1 comprises a conveying line mounting frame 11, wherein the conveying line mounting frame 11 is provided with a lower speed-chain conveying line 12 and an upper speed-chain conveying line 13 which respectively horizontally extend along the front direction and the rear direction. The lower speed-chain conveying line 12 is arranged below the upper speed-chain conveying line 13. The lower speed-chain conveying line 12 and the upper speed-chain conveying line 13 are arranged at intervals. In operation, the lower speed-chain conveying line 12 conveys the commodities from back to front, and the upper speed-chain conveying line 13 conveys the commodities from front to back.

Further, as shown in FIG. 3, the conveying line mounting frame 11 is provided a lifting conveying platform 14, which is located at the front end of the lower speed-chain conveying line 12 and the upper speed-chain conveying line 13. The lifting conveying platform 14 comprises an electric lifting platform arranged on the conveying line mounting frame 11, and the lifting end of the electric lifting platform is provided with a middle speed-chain conveying line extending horizontally along the front direction and the rear direction. The lower speed-chain conveying line 12 is provided with a lower material blocking mechanism 151, which is located at the rear end of the lifting conveying platform 14. The upper speed-chain conveying line 13 is provided with a first upper material blocking mechanism 152 and a second upper material blocking mechanism 153 which are sequentially arranged at intervals along the conveying direction of the upper speed-chain conveying line 13 and are located at the rear end of the lifting conveying platform 14. The upper speed-chain conveying line 13 is provided with an auxiliary lifting mechanism 16, which is located between the first upper material blocking mechanism 152 and the second upper material blocking mechanism 153.

Figure 4:
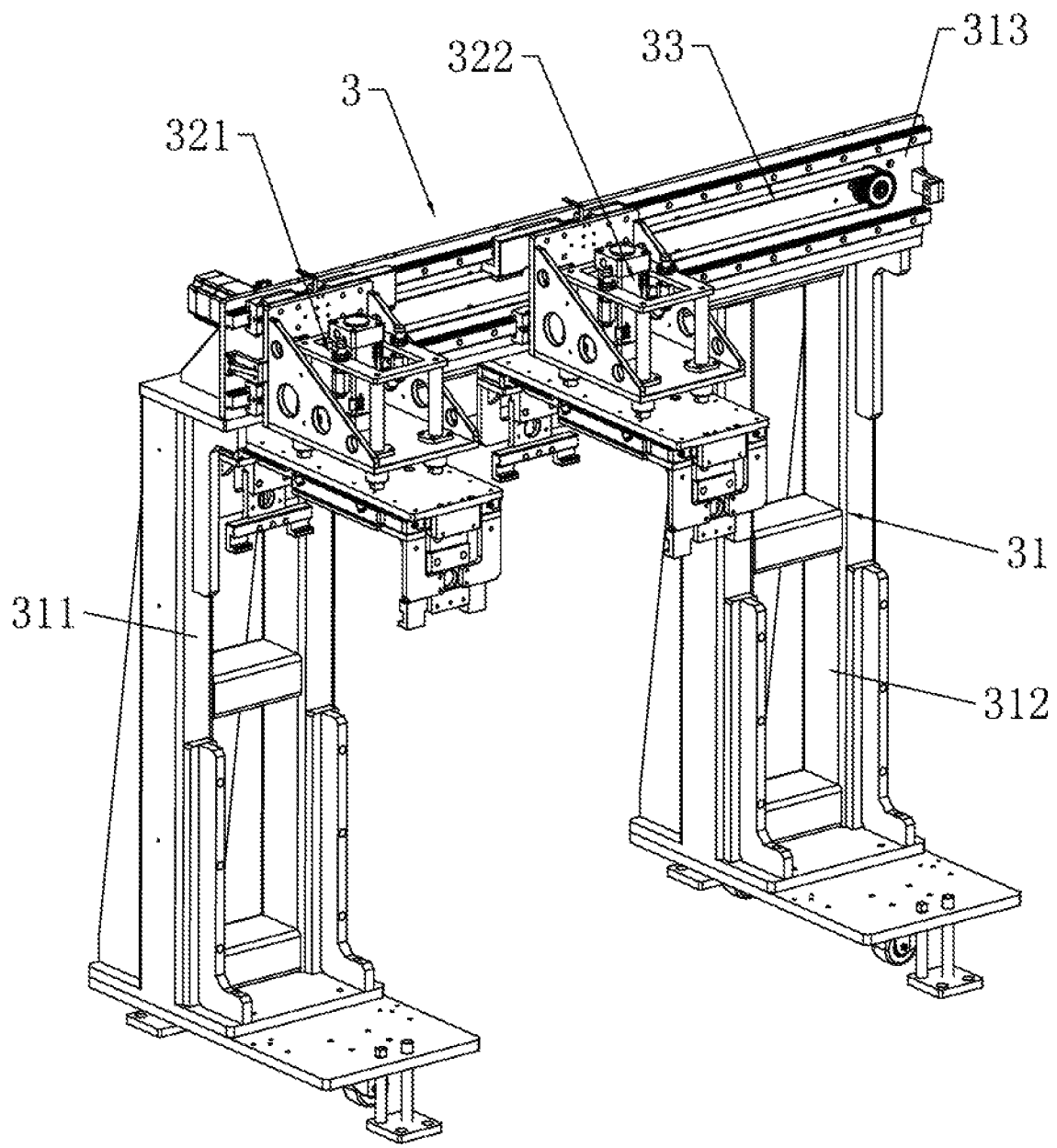
FIG. 4 is a conceptual diagram illustrating an exemplary structure of the transferring carrying assembly of the present invention.
Figure 5:
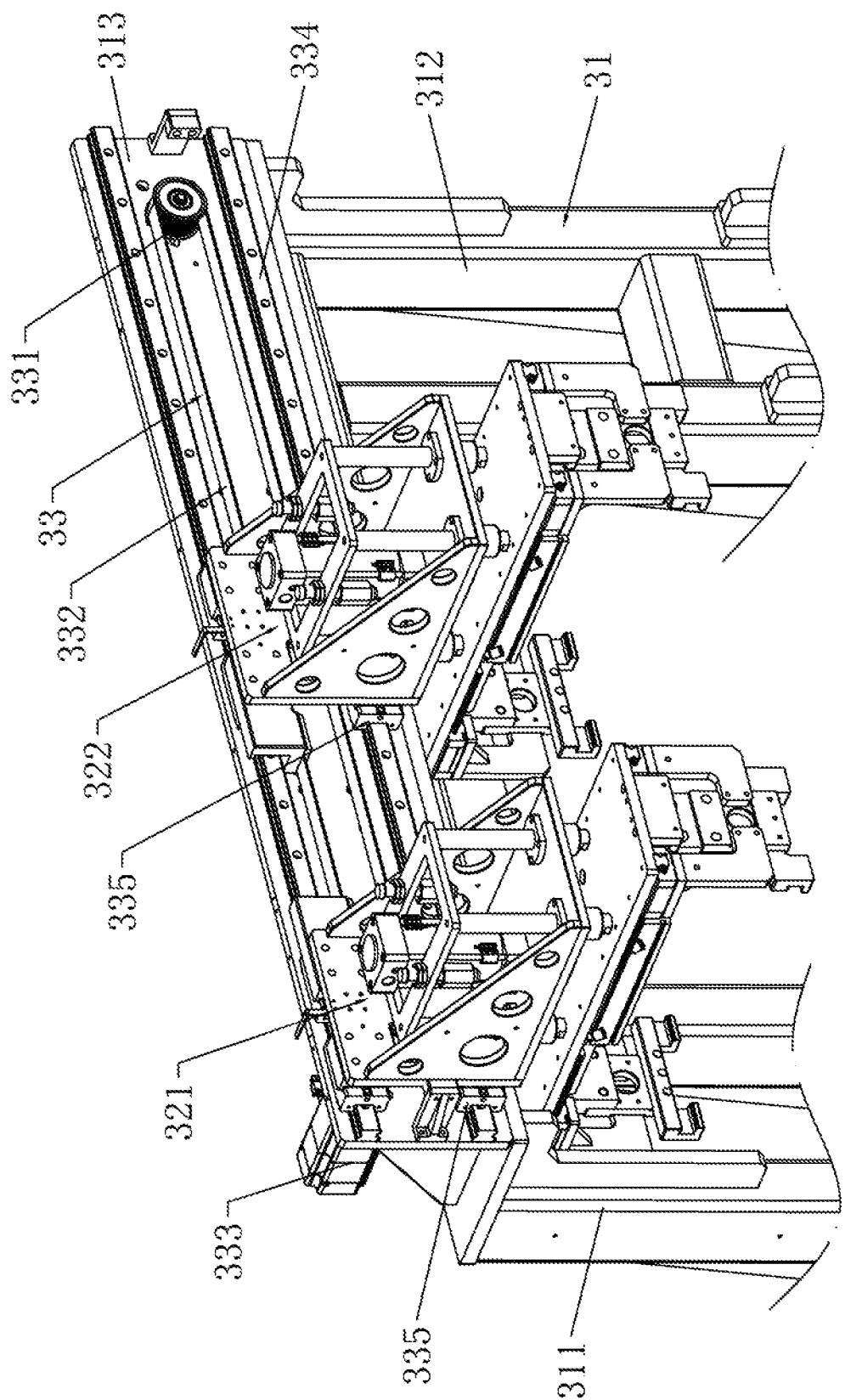
FIG. 5 is a conceptual diagram illustrating a partial structure of the transferring carrying assembly of the present invention.
Figure 6:
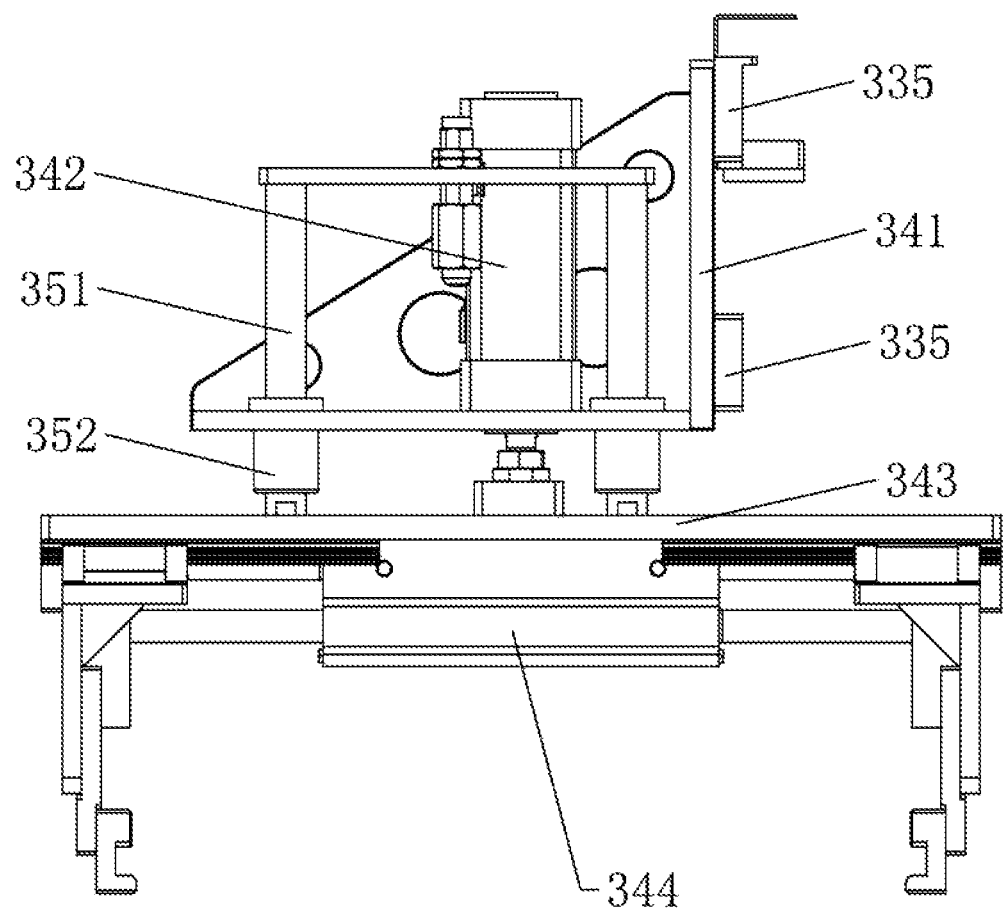
FIG. 6 is a conceptual diagram illustrating an exemplary structure of the left carrying mechanism or the right carrying mechanism of the present invention.

Further, as shown in FIGS. 4-6, the transferring carrying assembly 3 comprises a transferring carrying portal frame 31, wherein the transferring carrying portal frame 31 further comprises a portal frame left supporting seat 311 located at the left end of the conveying line assembly 1 and a portal frame right supporting seat 312 located at the right end of the conveying line assembly 1. A portal frame transverse seat 313 located at the upper end of the conveying line assembly 1 is arranged between the upper end of the portal frame left supporting seat 311 and the upper end of the portal frame right supporting seat 312. The left end and the right end of the portal frame transverse seat 313 are respectively in threaded connection with the upper end of the portal frame left supporting seat 311 and the upper end of the portal frame right supporting seat 312 on a corresponding side. The portal frame transverse seat 313 is provided with a left carrying mechanism 321 and a right carrying mechanism 322 synchronously moving in the same direction. The left side carrying mechanism 321 is located on the left end of the right carrying mechanism 322, and the left carrying mechanism 321 and the right carrying mechanism 322 are arranged at intervals. The portal frame transverse seat 313 is provided with a horizontal driving linear module 33 capable of horizontally moving left and right corresponding to the left carrying mechanism 321 and the right carrying mechanism 322. The driving ends of the horizontal driving linear module 33 are respectively in driving connection with the left carrying mechanism 321 and the right carrying mechanism 322.

It should be explained that, as shown in FIGS. 4-6, the left carrying mechanism 321 and the right carrying mechanism 322 respectively comprise a carrying horizontal-moving frame 341. Each carrying horizontal-moving frame 341 is in threaded connection with a carrying lifting driving air cylinder 342 capable of moving up and down. The lower end of each carrying horizontal-moving frame 341 is respectively provided with a carrying lifting moving frame 343. An extending end of a piston rod of each carrying lifting driving air cylinder 342 is respectively connected with a corresponding carrying lifting moving frame 343. Each carrying lifting moving frame 343 is respectively provided with a pneumatic clamping device 344. To make the carrying lifting moving frame 343 stably and reliably move up and down, a guiding structure is designed accordingly. More specifically, each carrying lifting moving frame 343 is respectively provided with a transferring carrying guide post 351 arranged vertically, and each carrying horizontal-moving frame 341 is respectively provided with a transferring carrying guide sleeve 352, wherein each transferring carrying guide post 351 is respectively inserted in a central hole of a corresponding transferring carrying guide sleeve 352.

Figure 7:
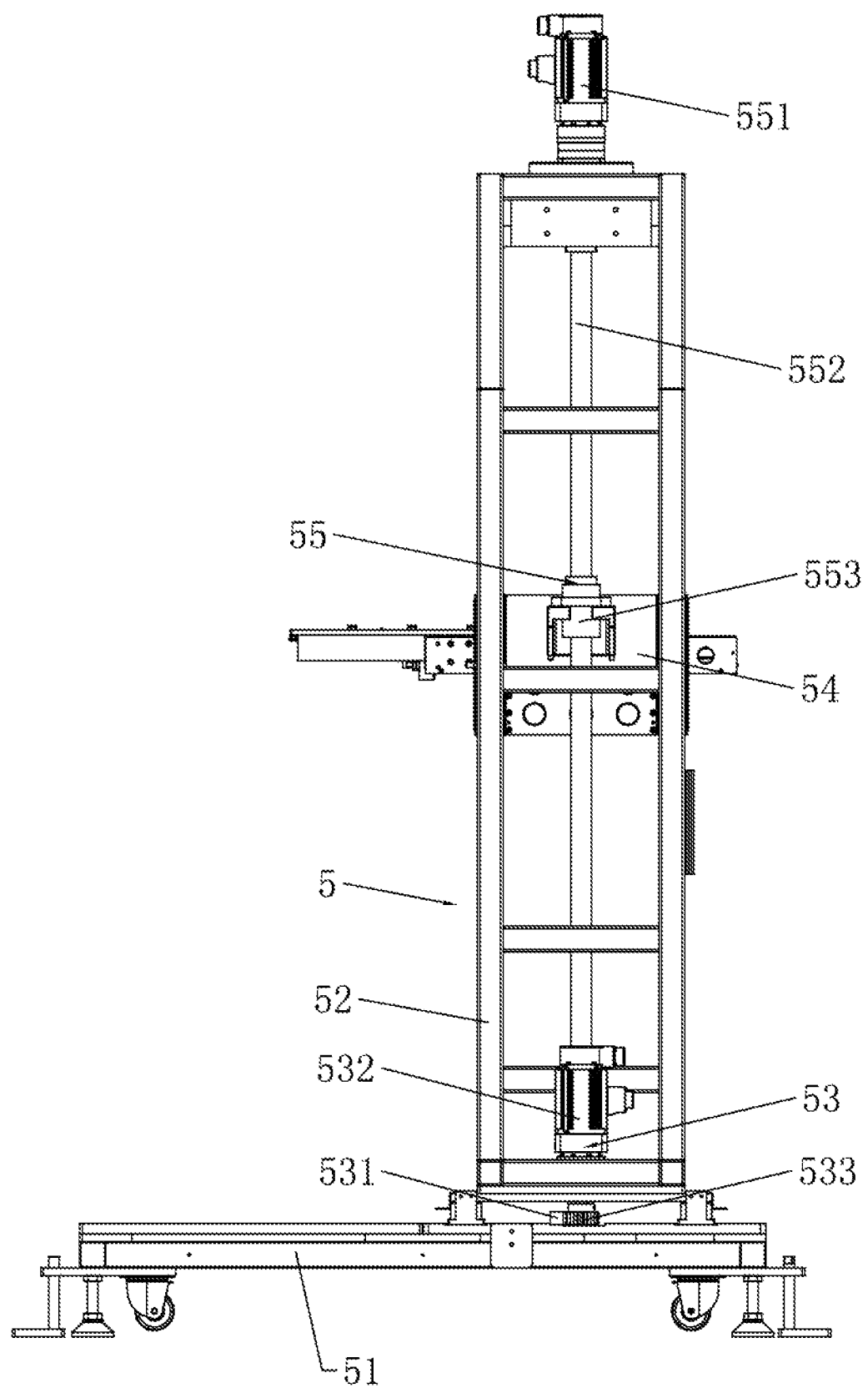
FIG. 7 is a conceptual diagram illustrating an exemplary structure of the storage pick-and-place mechanism of the present invention.
Figure 8:
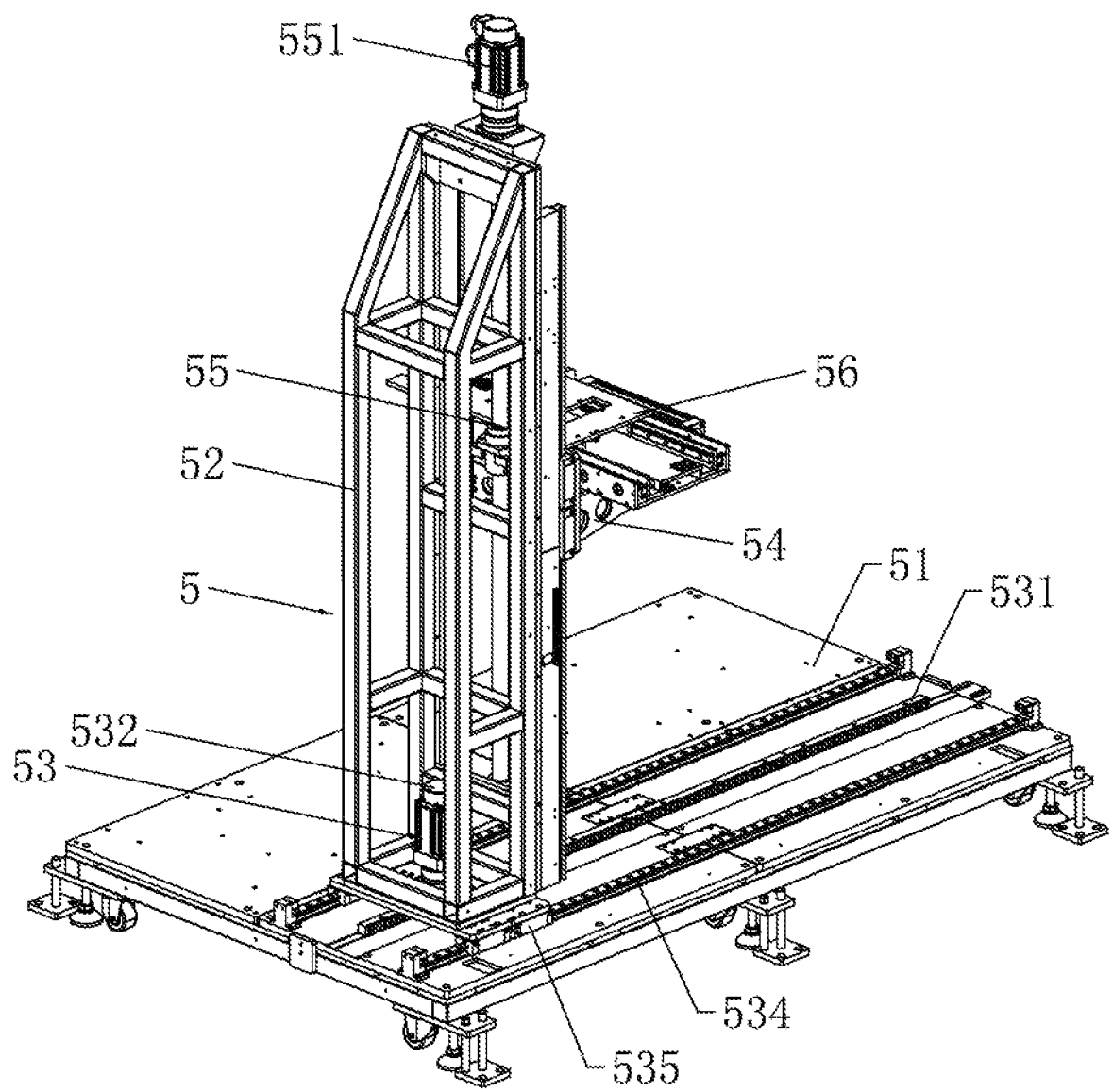
FIG. 8 is a conceptual diagram illustrating an exemplary structure of the storage pick-and-place mechanism of the present invention from another viewing angle.
Figure 9:
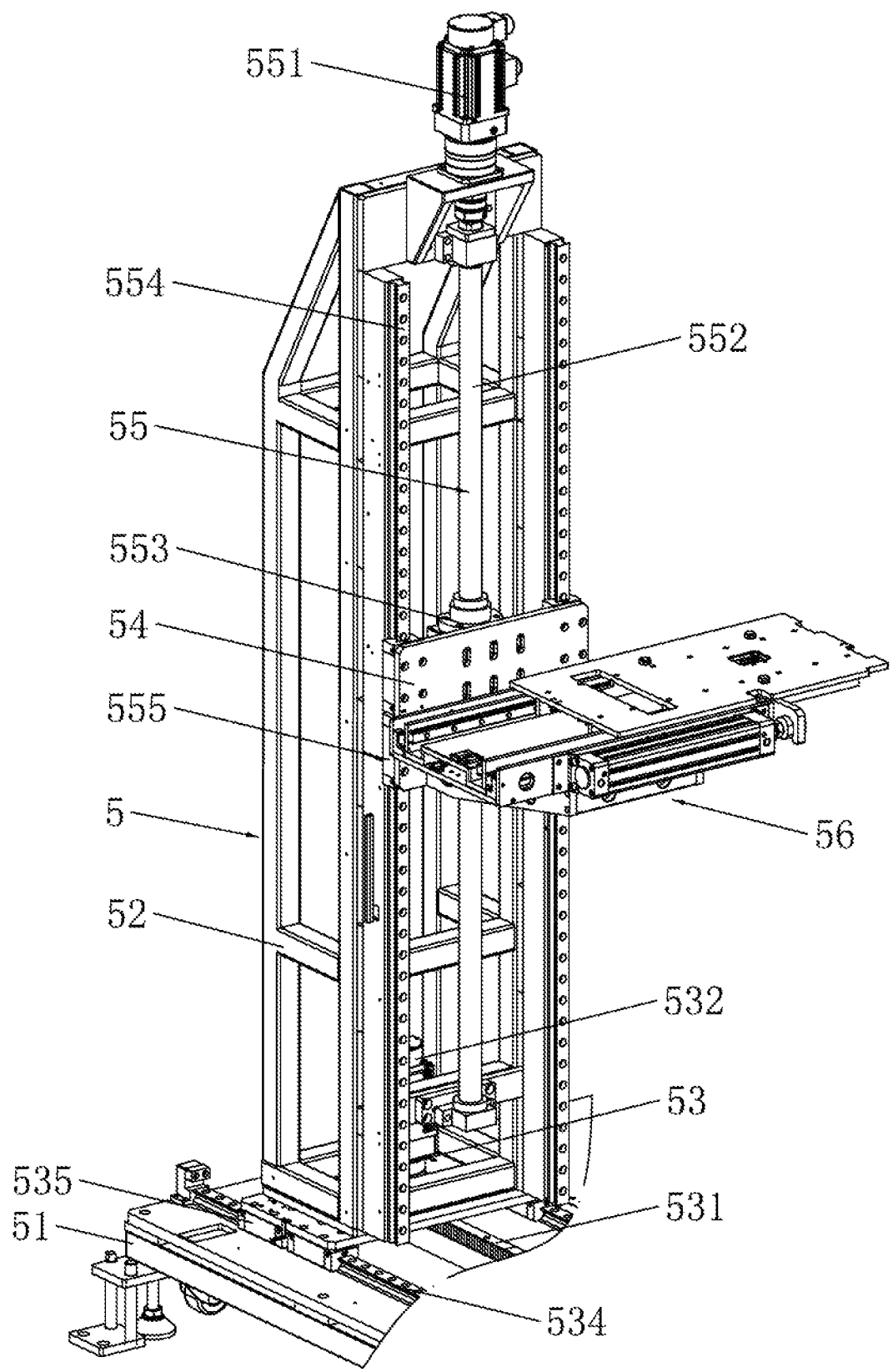
FIG. 9 is a conceptual diagram illustrating a partial structure of the storage pick-and-place mechanism of the present invention.

Moreover, as shown in FIGS. 1-2, the left storage assembly 21 and the right storage assembly 22 respectively comprise a storage rack 4 and a storage pick-and-place mechanism 5 located beside the storage rack 4. As shown in FIGS. 7-9, the storage pick-and-place mechanism 5 comprises a pick-and-place mounting base 51, and the upper end of the pick-and-place mounting base 51 is provided with a pick-and-place horizontal moving frame 52 capable of relatively horizontally moving left and right. A pick-and-place horizontal driving mechanism 53 is arranged between the pick-and-place mounting base 51 and the pick-and-place horizontal moving frame 52, and the pick-and-place horizontal driving mechanism 53 is in driving connection with the pick-and-place horizontal moving frame 52. The pick-and-place horizontal moving frame 52 is provided with a pick-and-place lifting moving frame 54 capable of relatively moving up and down, and the pick-and-place horizontal moving frame 52 is provided with a pick-and-place lifting driving mechanism 55 corresponding to the pick-and-place lifting moving frame 54. The pick-and-place lifting driving mechanism 55 is in driving connection with the pick-and-place lifting moving frame 54, and the pick-and-place lifting moving frame 54 is provided with a pick-and-place pushing mechanism 56.

Figure 10:
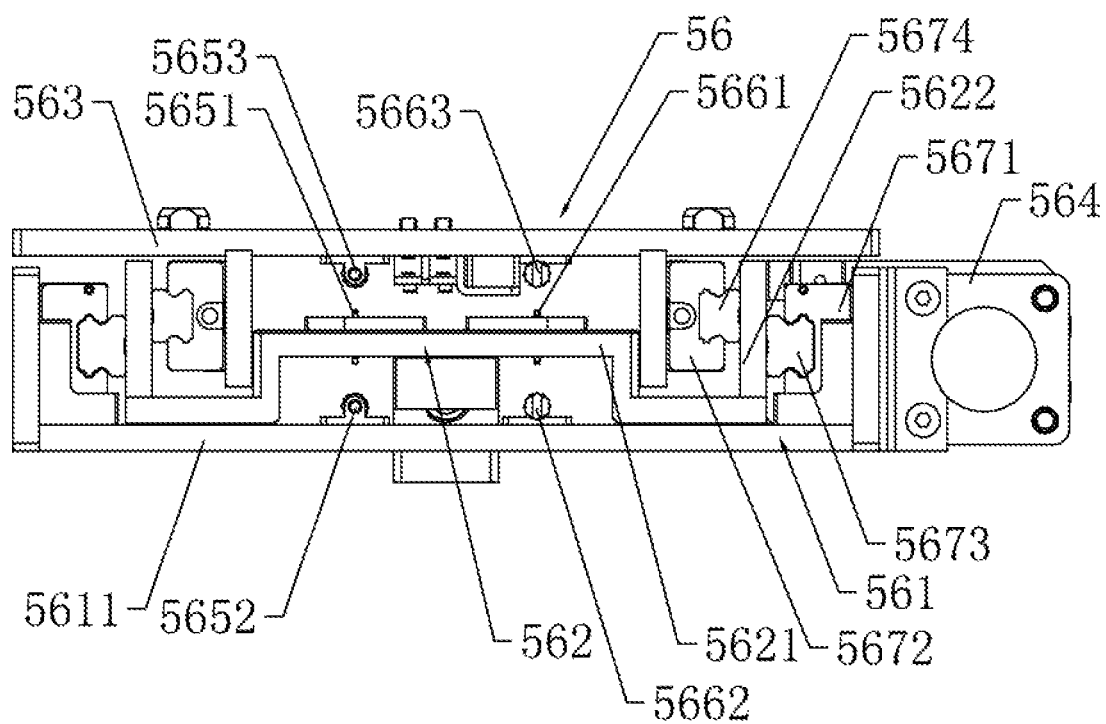
FIG. 10 is a conceptual diagram illustrating an exemplary structure of the pick-and-place pushing mechanism of the present invention.
Figure 11:
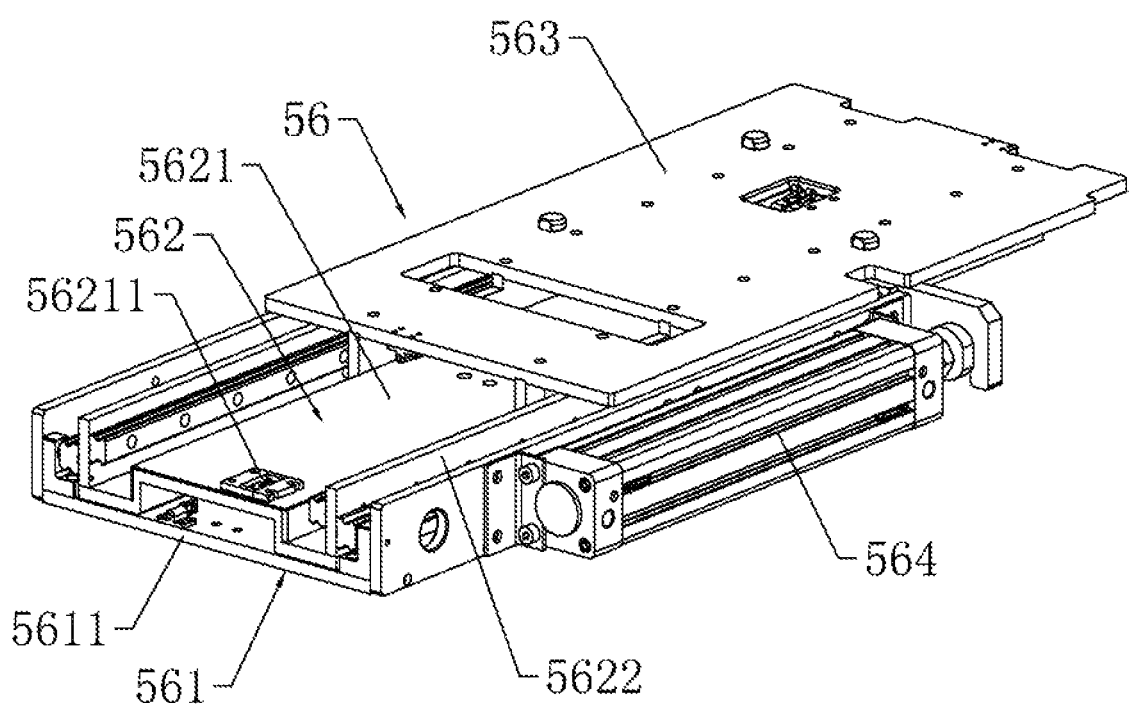
FIG. 11 is a conceptual diagram illustrating an exemplary structure of the pick-and-place pushing mechanism of the present invention from another viewing angle.

It should be noted that, as shown in FIGS. 10-11, the pick-and-place pushing mechanism 56 comprises a pick-and-place pushing fixed seat 561, a pick-and-place pushing moving seat 562 and a pick-and-place support plate 563. The pick-and-place pushing fixed seat 561 is in threaded connection with the pick-and-place lifting moving frame 54, and the pick-and-place pushing fixed seat 561 is provided with a fixed seat bottom plate 5611. The pick-and-place pushing moving seat 562 is provided with a moving seat bottom plate 5621 located at the upper end of the fixed seat bottom plate 5611, and the pick-and-place support plate 563 is located at the upper end of the moving seat bottom plate 5621. The pick-and-place pushing fixed seat 561 in threaded connection with a pick-and-place pushing driving air cylinder capable of horizontally moving front and back, and an extending end of a piston rod of the pick-and-place pushing driving air cylinder is connected with the pick-and-place pushing moving seat 562. The moving seat bottom plate 5621 is provided with a first chain wheel 5651 and a second chain wheel 5661. The moving seat bottom plate 5621 is provided with a bottom plate through hole 56211 corresponding to the first chain wheel 5651 and the second chain wheel 5661, wherein the first chain wheel 5651 and the second chain wheel 5661 are respectively mounted in the bottom plate through hole 56211 of the moving seat bottom plate 5621 through a rotating shaft.

Additionally, the fixed seat bottom plate 5611 is provided with a first lower connecting piece 5652 corresponding to the first chain wheel 5651, and the pick-and-place support plate 563 is provided with a first upper connecting piece 5653 corresponding to the first chain wheel 5651. The first lower connecting piece 5652 and the first upper connecting piece 5653 are respectively located at the rear end of the first chain wheel 5651, a first chain is connected between the first lower connecting piece 5652 and the first upper connecting piece 5653, and the first chain winds around the first chain wheel 5651. The fixed seat bottom plate 5611 is provided with a second lower connecting piece 5662 corresponding to the second chain wheel 5661, and the pick-and-place support plate 563 is provided with a second upper connecting piece 5663 corresponding to the second chain wheel 5661. The second lower connecting piece 5662 and the second upper connecting piece 5663 are respectively located at the front end of the second chain wheel 5661, a second chain is connected between the second lower connecting piece 5662 and the second upper connecting piece 5663, and the second chain winds around the second chain wheel 5661.

To make the pick-and-place pushing moving seat 562 and the pick-and-place support plate 563 move stably and reliably, the present invention adopts a guiding structure. More specifically, as shown in FIGS. 10 and 11, the pick-and-place pushing fixed seat 561 is in threaded connection with a fixed seat sliding block 5671, and the pick-and-place support plate 563 in threaded connection with a support plate sliding block 5672. The pick-and-place pushing moving seat 562 is provided with a guiding rail mounting plate 5622. The guiding rail mounting plate 5622 is in threaded connection with a first guiding rail 5673 interacting with the fixed seat sliding block 5671 and a second guiding rail 5674 interacting with the support plate sliding block 5672. The first guiding rail 5673 and the second guiding rail 5674 respectively extend horizontally along the front direction and the rear direction.

For the transferring carrying assembly 3 of the present invention, the horizontal driving linear module 33 propels the left carrying mechanism 321 and the right carrying mechanism 322 to synchronously move in the same direction during the transferring process of the commodities. When the left carrying mechanism 321 moves to the position above the auxiliary lifting mechanism 16, the right carrying mechanism 322 is just in the position where a commodity is placed. At this point, the left carrying mechanism 321 grabs the commodity and the right carrying mechanism 322 places the grabbed commodity onto the storage mechanism of the right storage assembly 22. When the right carrying mechanism 322 moves to the position above the auxiliary lifting mechanism 16, the left carrying mechanism 321 is just in the position wherein a commodity is placed. At this point, the right carrying mechanism 322 grabs the commodity and the left carrying mechanism 321 places the grabbed commodity onto the storage mechanism of the left storage assembly 21. Therefore, through adopting the present invention, the commodities can be alternatively grabbed and carried by means of the left carrying mechanism 321 and the right carrying mechanism 322.

For the storage pick-and-place mechanism 5 of the present invention, the pick-and-place support plate 563 is used for supporting the commodities. When placing a commodity on the storage rack 4 by the storage pick-and-place mechanism 5, the pick-and-place horizontal driving mechanism 53 propels the pick-and-place horizontal moving frame 52 to horizontally move left and right, and the pick-and-place lifting driving mechanism 55 propels the pick-and-place lifting moving frame 54 to move up and down. Namely, the pick-and-place horizontal driving mechanism 53 and the pick-and-place lifting driving mechanism 55 are capable of propelling the pick-and-place pushing mechanism 56 to move to a designated position of the storage rack 4. When the commodity placed on the pick-and-place support plate 563 is moved to and aligned with the designated position of the storage rack 4 under the propelling action of the pick-and-place horizontal driving mechanism 53 and the pick-and-place lifting driving mechanism 55, the pick-and-place pushing driving air cylinder acts to push the pick-and-place pushing moving seat 562 to move forward. In this process, the pick-and-place pushing moving seat propels the second chain to move, and the second chain further pulls the second upper connecting piece 5663 and the pick-and-place support plate 563 to move. Thus, the pick-and-place support plate 563 moves forward relative to the pick-and-place pushing moving seat 562, thereby pushing the commodity supported by the pick-and-place support plate 563 to a designated position of the storage rack 4. After the commodity is placed in the designated position of the storage rack 4, the pick-and-place pushing driving air cylinder acts reversely to propel the pick-and-place pushing moving seat 562 to move backward. In this process, the pick-and-place pushing moving seat 562 pulls the first chain to move through the first chain wheel 5651, and the first chain further pulls the first upper connecting piece 5653 and the pick-and-place support plate 563 to move backward, thus allowing the pick-and-place support plate 563 to return to an initial position.

When storing a commodity on the storage rack 4, the commodity to be stored is conveyed from back to front by the lower speed-chain conveying line 12. The lower material blocking mechanism 151 acts to block the commodity when the middle speed-chain conveying line of the lifting conveying platform 14 does not move to a receiving position. After the middle speed-chain conveying line of the lifting conveying platform 14 moves downward to the receiving position, the lower material blocking mechanism 151 acts again and moves away from the commodity, so that the commodity continuously moves forward along with the lower speed-chain conveying line 12, and the lower speed-chain conveying line 12 finally conveys the commodity to the middle speed-chain conveying line of the lifting conveying platform 14. After the lower speed-chain conveying line 12 conveys the commodity to the middle speed-chain conveying line, the electric lifting platform of the lifting conveying platform 14 acts to lift the middle speed-chain conveying line up, thereby enabling the middle speed-chain conveying line to move up and be aligned with the upper speed-chain conveying line 13. After the middle speed-chain conveying line is lifted up in place, the middle speed-chain conveying line acts to convey the commodity to the upper speed-chain conveying line 13, and the upper speed-chain conveying line 13 conveys the commodity from front to back. When conveying a commodity using the upper speed-chain conveying line 13, the second upper material blocking mechanism 153 is adjusted to a blocking position for blocking the commodity. After the commodity is blocked by the second upper material blocking mechanism 153, the first upper material blocking mechanism 152 is adjusted to a blocking position for blocking the subsequent products. The second upper blocking mechanism blocks the commodity above the auxiliary lifting mechanism 16, and then the auxiliary lifting mechanism 16 acts to lift the commodity up to a grabbing position. After the commodity is lifted up to the grabbing position, the horizontal driving linear module 33 propels the left carrying mechanism 321 and the right carrying mechanism 322 to move, thus allowing the left carrying mechanism 321 or the right carrying mechanism 322 to grab the commodity. Subsequently, the horizontal driving linear module 33 propels the left carrying mechanism 321 and the right carrying mechanism 322 to move, thereby enabling the commodity to be transferred to the storage pick-and-place mechanism 5. Finally, the commodity is transferred to the storage pick-and-place mechanism 5 and is stored on a storage rack 4.

Through adopting the aforesaid structural design, the picking and placing of the commodities are achieved automatically and efficiently. The present invention has the benefits of structural design, high automation degree and high operating efficiency.

In another preferred embodiment, as shown in FIG. 3, the lower material blocking mechanism 151, the first upper material blocking mechanism 152 and the second upper material blocking mechanism 153 respectively comprise a material blocking driving air cylinder 1541 which is in threaded connection with the conveying line mounting frame 11 and is capable of moving up and down. The extending end of the piston rod of each material blocking driving air cylinder 1541 is respectively provided with a moving material-blocking block 1542. When the lower material blocking mechanism 151, the first upper material blocking mechanism 152, the second upper material blocking mechanism 153 operate to achieve the material blocking, the material blocking driving air cylinder 1541 pushes the moving material-blocking block 1542 up, and then the moving material-blocking block being moved up in place prevents the commodity from moving continuously.

In another preferred embodiment, as shown in FIG. 3, the auxiliary lifting mechanism 16 comprises a lifting driving air cylinder 161 which is in threaded connection with the conveying line mounting frame 11 and is capable of moving up and down, and the extending end of the piston rod of the lifting driving air cylinder 161 is provided with a moving lifting platform 162. A lifting guiding post extending downward vertically is in threaded connection with the moving lifting platform 162, a lifting guiding sleeve corresponding to the lifting guiding post is in threaded connection with the conveying line mounting frame 11, and the lifting guiding post is inserted in the central hole of the lifting guiding sleeve.

When the auxiliary lifting mechanism 16 of the present invention lifts the commodity up to a grabbing position, the lifting driving air cylinder 161 acts to push the moving lifting platform 162 up, and then the moving lifting platform 162 lifts the commodity located above up, so that the commodity is moved up to the grabbing position.

In addition, the lifting guiding sleeve interacts with the lifting guiding post to ensure that the moving lifting platform 162 moves up and down stably and reliably.

In another preferred embodiment, as shown in FIGS. 4-5, the horizontal driving linear module 33 comprises a driving synchronous belt wheel and a driven synchronous belt wheel 331 which are respectively arranged on the portal frame transverse seat 313. The driving synchronous belt wheel and the driven synchronous belt wheel 331 are arranged horizontally at intervals and are aligned with each other. A transmission synchronous belt 332 is wound between the driving synchronous belt wheel and the driven synchronous belt wheel 331. The carrying horizontal-moving frame 341 of the left carrying mechanism 321 and the carrying horizontal-moving frame 341 of the right carrying mechanism 322 are respectively fastened and connected with the transmission synchronous belt 332.

The portal frame transverse seat 313 is provided with a transferring carrying driving motor 333 corresponding to the driving synchronous belt wheel, and the output shaft of the transferring carrying driving motor 333 is in driving connection with the driving synchronous belt wheel.

When the horizontal driving linear module 33 propels the left carrying mechanism 321 and the right carrying mechanism 322 to synchronously move in the same direction, the transferring carrying driving motor 333 propels the driving synchronous belt wheel to rotate, and the driving synchronous belt wheel further propels the transmission synchronous belt 332 to move. At this point, the transmission synchronous belt 332 propels each carrying horizontal-moving frame 341 to move horizontally, thus enabling the left carrying mechanism 321 and the right carrying mechanism 322 to move synchronously.

To make the left carrying mechanism 321 and the right carrying mechanism 322 horizontally move left and right stably and reliably, the present invention adopts a guiding structure. More specifically, the portal frame transverse seat 313 is in threaded connection with a transferring carrying guiding rail 334 extending horizontally along the left direction and the right direction, each carrying horizontal-moving frame 341 is in threaded connection with a transferring carrying sliding block 335, and each transferring carrying sliding block 335 interacts with a rotating shaft carrying guiding rail.

In another preferred embodiment, as shown in FIGS. 7-9, the pick-and-place driving mechanism 53 comprises a horizontal driving gear rack 531 which is in threaded connection with the pick-and-place mounting base 51 and extends horizontally along the left direction and the right direction. A pick-and-place horizontal driving motor 532 is in threaded connection with the lower end of the pick-and-place horizontal moving frame 52, the output shaft of the pick-and-place horizontal driving motor 532 is provided with a pick-and-place horizontal driving gear 533, and the horizontal driving gear rack 531 is meshed with the pick-and-place horizontal driving gear 533.

When the pick-and-place driving mechanism 53 propels the pick-and-place horizontal moving frame 52 to horizontally move left and right, the pick-and-place horizontal driving motor 532 propels the pick-and-place horizontal driving gear 533 to rotate. Because the horizontal driving gear rack 531 is meshed with the pick-and-place horizontal driving gear 533, the pick-and-place horizontal driving gear 533 rotates along the horizontal driving gear rack 531, thereby enabling the pick-and-place horizontal moving frame 52 to horizontally move left and right relative to the pick-and-place mounting base 51.

To make the pick-and-place horizontal moving frame 52 move left and right stably and reliably, the present invention adopts a guiding structure. More specifically, the pick-and-place mounting base 51 is in threaded connection with a pick-and-place horizontal guiding rail 534 located beside the pick-and-place horizontal driving gear rack 531 and horizontally extending along the right direction and the left direction. The lower end of the pick-and-place horizontal moving frame 52 is in threaded connection with a pick-and-place horizontal sliding block 535, and pick-and-place horizontal guiding rail 534 interacts with the pick-and-place horizontal sliding block 535.

In another preferred embodiment, as shown in FIGS. 7-9, the pick-and-place lifting driving mechanism 55 comprises a pick-and-place lifting driving motor 551 in threaded connection with the upper end of the pick-and-place horizontal moving frame 52 and a vertically-arranged pick-and-place lifting driving screw rod 552 mounted on the pick-and-place horizontal moving frame 52 through a bearing seat. A pick-and-place lifting moving frame 54 is in threaded connection with a pick-and-place lifting lead screw nut 553 corresponding to the pick-and-place lifting driving screw rod 552, and the pick-and-place lifting lead screw nut 553 interacts with the pick-and-place lifting driving screw rod 552.

When the pick-and-place lifting driving mechanism 55 propels the pick-and-place lifting moving frame 54 to move up and down, the pick-and-place lifting driving motor 551 propels the pick-and-place lifting moving frame 54 to move up and down through a screw rod transmission mechanism composed of the pick-and-place lifting driving screw rod 552 and the pick-and-place lifting lead screw nut 553.

To enable the pick-and-place lifting moving frame 54 to move up and down stably and reliably, the present invention adopts a guiding structure. More specifically, the pick-and-place horizontal moving frame 52 is in threaded connection with a vertically-arranged pick-and-place lifting guiding rail 554, the pick-and-place lifting moving frame 54 is in threaded connection with a pick-and-place lifting sliding block 555 corresponding to the pick-and-place lifting guiding rail 554, and the pick-and-place lifting guiding rail 554 interacts with the pick-and-place lifting sliding block 555.

The above are merely preferred embodiments of the present invention. For those skilled in the art, various modifications may be made to the implementation mode and application scope based on the idea of the present invention. Therefore, the specification should not be understood as a limitation to the present invention.

What is claimed is:

1. A stereoscopic warehousing equipment, comprising:
a conveying line assembly (1),
a left storage assembly (21) located at an left end of the conveying line assembly (1), a right storage assembly (22) located at a right end of the conveying line assembly (1), and
a transferring carrying assembly (3) arranged above the conveying line assembly (1) and located between the left storage assembly (21) and the right storage assembly (22), wherein the conveying line assembly (1) further comprising:
a conveying line mounting frame (11), wherein the conveying line mounting frame (11) is provided with a lower speed-chain conveying line (12) and an upper speed-chain conveying line (13) which respectively horizontally extend along the front direction and the rear direction, wherein the lower speed-chain conveying line (12) is arranged below the upper speed-chain conveying line (13), wherein the lower speed-chain conveying line (12) and the upper speed-chain conveying line (13) are arranged at intervals, wherein the lower speed-chain conveying line (12) is capable of conveying commodities from back to front, and the upper speed-chain conveying line (13) is capable of conveying commodities from front to back, wherein the conveying line mounting frame (11) is provided a lifting conveying platform (14), which is located at front end of the lower speed-chain conveying line (12) and the upper speed-chain conveying line (13), wherein the lifting conveying platform (14) further comprising:

an electric lifting platform arranged on the conveying line mounting frame (11), and a lifting end of the electric lifting platform is provided with a middle speed-chain conveying line extending horizontally along the front direction and the rear direction, wherein the lower speed-chain conveying line (12) is provided with a lower material blocking mechanism (151), which is located at rear end of the lifting conveying platform (14), wherein the upper speed-chain conveying line (13) is provided with a first upper material blocking mechanism (152) and a second upper material blocking mechanism (153) which are sequentially arranged at intervals along the conveying direction of the upper speed-chain conveying line (13) and are located at rear end of the lifting conveying platform (14), wherein the upper speed-chain conveying line (13) is provided with an auxiliary lifting mechanism (16), which is located between the first upper material blocking mechanism (152) and the second upper material blocking mechanism (153), wherein the transferring carrying assembly (3) further comprising a transferring carrying portal frame (31), wherein the transferring carrying portal frame (31) further comprising:

a portal frame left supporting seat (311) located at the left end of the conveying line assembly (1) and a portal frame right supporting seat (312) located at the right end of the conveying line assembly (1), wherein a portal frame transverse seat (313) located at the upper end of the conveying line assembly (1) is arranged between upper end of the portal frame left supporting seat (311) and upper end of the portal frame right supporting seat (312), wherein left end and right end of the portal frame transverse seat (313) are respectively in threaded connection with upper end of the portal frame left supporting seat (311) and upper end of the portal frame right supporting seat (312) on a corresponding side, wherein the portal frame transverse seat (313) is provided with a left carrying mechanism (321) and a right carrying mechanism (322) synchronously moving in same direction, wherein the left side carrying mechanism (321) is located on left end of the right carrying mechanism (322), and the left carrying mechanism (321) and the right carrying mechanism (322) are arranged at intervals, wherein the portal frame transverse seat (313) is provided with a horizontal driving linear module (33) capable of horizontally moving left and right corresponding to the left carrying mechanism (321) and the right carrying mechanism (322), wherein a driving ends of the horizontal driving linear module (33) are respectively in driving connection with the left carrying mechanism (321) and the right carrying mechanism (322), wherein the left carrying mechanism (321) and the right carrying mechanism (322) each comprising:

a carrying horizontal-moving frame (341), wherein each carrying horizontal-moving frame (341) is in threaded connection with a carrying lifting driving air cylinder (342) capable of moving up and down, wherein lower end of each carrying horizontal-moving frame (341) is respectively provided with a carrying lifting moving frame (343), wherein an extending end of a piston rod of each carrying lifting driving air cylinder (342) is respectively connected with a corresponding carrying lifting moving frame (343), wherein each carrying lifting moving frame (343) is respectively provided with a pneumatic clamping device (344), wherein the left storage assembly (21) and the right storage assembly (22) each comprising:

a storage rack (4) and a storage pick-and-place mechanism (5) located beside the storage rack (4), wherein the storage pick-and-place mechanism (5) comprising:

a pick-and-place mounting base (51), and upper end of the pick-and-place mounting base (51) is provided with a pick-and-place horizontal moving frame (52) capable of relatively horizontally moving left and right, wherein a pick-and-place horizontal driving mechanism (53) is arranged between the pick-and-place mounting base (51) and the pick-and-place horizontal moving frame (52), and the pick-and-place horizontal driving mechanism (53) is in driving connection with the pick-and-place horizontal moving frame (52), wherein the pick-and-place horizontal moving frame (52) is provided with a pick-and-place lifting moving frame (54) capable of relatively moving up and down, and the pick-and-place horizontal moving frame (52) is provided with a pick-and-place lifting driving mechanism (55) corresponding to the pick-and-place lifting moving frame (54), wherein the pick-and-place lifting driving mechanism (55) is in driving connection with the pick-and-place lifting moving frame (54), and the pick-and-place lifting moving frame (54) is provided with a pick-and-place pushing mechanism (56).

2. The stereoscopic warehousing equipment of claim 1, wherein the pick-and-place pushing mechanism (56) comprising:

a pick-and-place pushing fixed seat (561), a pick-and-place pushing moving seat (562) and a pick-and-place support plate (563), wherein the pick-and-place pushing fixed seat (561) is fixed and in threaded connection with the pick-and-place lifting moving frame (54), and the pick-and-place pushing fixed seat (561) is provided with a fixed seat bottom plate (5611), wherein the pick-and-place pushing moving seat (562) is provided with a moving seat bottom plate (5621) located at upper end of the fixed seat bottom plate (5611), and the pick-and-place support plate (563) is located at upper end of the moving seat bottom plate (5621), wherein the pick-and-place pushing fixed seat (561) in threaded connection with a pick-and-place pushing driving air cylinder capable of horizontally moving front and back, and an extending end of a piston rod of the pick-and-place pushing driving air cylinder is connected with the pick-and-place pushing moving seat (562), wherein the moving seat bottom plate (5621) is provided with a first chain wheel (5651) and a second chain wheel (5661), wherein the moving seat bottom plate (5621) is provided with a bottom plate through hole (56211) corresponding to the first chain wheel (5651) and the second chain wheel (5661), wherein the first chain wheel (5651) and the second chain wheel (5661) are each respectively mounted in the bottom plate through hole (56211) of the moving seat bottom plate (5621) through a rotating shaft, wherein the fixed seat bottom plate (5611) is provided with a first lower connecting piece (5652) corresponding to the first chain wheel (5651), and the pick-and-place support plate (563) is provided with a first upper connecting piece (5653) corresponding to the first chain wheel (5651), wherein the first lower connecting piece (5652) and the first upper connecting piece (5653) are respectively located at the rear end of the first chain wheel (5651), a first chain is connected between the first lower connecting piece (5652) and the first upper connecting piece (5653), and the first chain winds around the first chain wheel (5651), wherein the fixed seat bottom plate (5611) is provided with a second lower connecting piece (5662) corresponding to the second chain wheel (5661), and the pick-and-place support plate (563) is provided with a second upper connecting piece (5663) corresponding to the second chain wheel (5661), wherein the second lower connecting piece (5662) and the second upper connecting piece (5663) are respectively located at the front end of the second chain wheel (5661), a second chain is connected between the second lower connecting piece (5662) and the second upper connecting piece (5663), and the second chain winds around the second chain wheel (5661).

3. The stereoscopic warehousing equipment of claim 2, wherein the pick-and-place pushing fixed seat (561) is in threaded connection with a fixed seat sliding block (5671), and the pick-and-place support plate (563) is in threaded connection with a support plate sliding block (5672), wherein the pick-and-place pushing moving seat (562) is provided with a guiding rail mounting plate (5622), wherein the guiding rail mounting plate (5622) is in threaded connection with a first guiding rail (5673) interacting with the fixed seat sliding block (5671) and a second guiding rail (5674) interacting with the support plate sliding block (5672), wherein the first guiding rail (5673) and the second guiding rail (5674) respectively extend horizontally along the front direction and the rear direction.

4. The stereoscopic warehousing equipment of claim 1, wherein the lower material blocking mechanism (151), the first upper material blocking mechanism (152) and the second upper material blocking mechanism (153) each comprising a material blocking driving air cylinder (1541) which is in threaded connection with the conveying line mounting frame (11) and is capable of moving up and down, wherein an extending end of the piston rod of each material blocking driving air cylinder (1541) is respectively provided with a moving material-blocking block (1542).

5. The stereoscopic warehousing equipment of claim 1, wherein the auxiliary lifting mechanism (16) comprising:
a lifting driving air cylinder (161) which is in threaded connection with the conveying line mounting frame (11) and is capable of moving up and down, and an extending end of the piston rod of the lifting driving air cylinder (161) is provided with a moving lifting platform (162), wherein a lifting guiding post extending downward vertically is in threaded connection with the moving lifting platform (162), a lifting guiding sleeve corresponding to the lifting guiding post is in threaded connection with the conveying line mounting frame (11), and the lifting guiding post is inserted in the central hole of the lifting guiding sleeve.

6. The stereoscopic warehousing equipment of claim 1, wherein the horizontal driving linear module (33) comprising:
a driving synchronous belt wheel and a driven synchronous belt wheel (331) which are respectively arranged on the portal frame transverse seat (313), wherein the driving synchronous belt wheel and the driven synchronous belt wheel (331) are arranged horizontally at intervals and are aligned with each other, wherein a transmission synchronous belt (332) is wound between the driving synchronous belt wheel and the driven synchronous belt wheel (331), wherein the carrying horizontal-moving frame (341) of the left carrying mechanism (321) and the carrying horizontal-moving frame (341) of the right carrying mechanism (322) are respectively fixedly connected with the transmission synchronous belt (332), wherein the portal frame transverse seat (313) is provided with a transferring carrying driving motor (333) corresponding to the driving synchronous belt wheel, and the output shaft of the transferring carrying driving motor (333) is in driving connection with the driving synchronous belt wheel.

7. The stereoscopic warehousing equipment of claim 6, wherein the portal frame transverse seat (313) is in threaded connection with a transferring carrying guiding rail (334) extending horizontally along the left direction and the right direction, each carrying horizontal-moving frame (341) is in threaded connection with a transferring carrying sliding block (335), and each transferring carrying sliding block (335) interacts with a rotating shaft carrying guiding rail.

8. The stereoscopic warehousing equipment of claim 1, wherein each carrying lifting moving frame (343) is respectively provided with a transferring carrying guide post (351) arranged vertically, and each carrying horizontal-moving frame (341) is respectively provided with a transferring carrying guide sleeve (352), wherein each transferring carrying guide post (351) is respectively inserted in a central hole of a corresponding transferring carrying guide sleeve (352).

9. The stereoscopic warehousing equipment of claim 1, wherein the pick-and-place driving mechanism (53) comprises:
a horizontal driving gear rack (531) which is in threaded connection with the pick-and-place mounting base (51) and extends horizontally along the left direction and the right direction, wherein a pick-and-place horizontal driving motor (532) is in threaded connection with the lower end of the pick-and-place horizontal moving frame (52), the output shaft of the pick-and-place horizontal driving motor (532) is provided with a pick-and-place horizontal driving gear (533), and wherein the horizontal driving gear rack (531) is meshed with the pick-and-place horizontal driving gear (533), wherein the pick-and-place mounting base (51) is in threaded connection with a pick-and-place horizontal guiding rail (534) located beside the pick-and-place horizontal driving gear rack (531) and horizontally extends along the right direction and the left direction, wherein the lower end of the pick-and-place horizontal moving frame (52) is in threaded connection with a pick-and-place horizontal sliding block (535), and pick-and-place horizontal guiding rail (534) interacts with the pick-and-place horizontal sliding block (535).

10. The stereoscopic warehousing equipment of claim 1, wherein the pick-and-place lifting driving mechanism (55) comprising:
a pick-and-place lifting driving motor (551) in threaded connection with the upper end of the pick-and-place horizontal moving frame (52) and a vertically-arranged pick-and-place lifting driving screw rod (552) mounted on the pick-and-place horizontal moving frame (52) through a bearing seat, wherein a pick-and-place lifting moving frame (54) is in threaded connection with a pick-and-place lifting lead screw nut (553) corresponding to the pick-and-place lifting driving screw rod (552), and the pick-and-place lifting lead screw nut (553) interacts with the pick-and-place lifting driving screw rod (552), wherein the pick-and-place horizontal moving frame (52) is in threaded connection with a vertically-arranged pick-and-place lifting guiding rail (554), the pick-and-place lifting moving frame (54) is in threaded connection with a pick-and-place lifting sliding block (555) corresponding to the pick-and-place lifting guiding rail (554), and the pick-and-place lifting guiding rail (554) interacts with the pick-and-place lifting sliding block (555).

* * * * *